(12) United States Patent
Bennett, III

(10) Patent No.: US 10,950,085 B2
(45) Date of Patent: *Mar. 16, 2021

(54) SYSTEM AND METHOD FOR PROVIDING PLAYERS WITH LOCATION OF LOTTERY TICKETS WITH SPECIFIC GAME PLAY CHARACTERS

(71) Applicant: Scientific Games International, Inc., Newark, DE (US)

(72) Inventor: Joseph W. Bennett, III, Suwanee, GA (US)

(73) Assignee: Scientific Games International, Inc., Newark, DE (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/997,829

(22) Filed: Jun. 5, 2018

(65) Prior Publication Data

US 2019/0371113 A1    Dec. 5, 2019

(51) Int. Cl.
*G07F 17/32*    (2006.01)
*G06F 16/29*    (2019.01)
*G07C 15/00*    (2006.01)

(52) U.S. Cl.
CPC ............ *G07F 17/323* (2013.01); *G06F 16/29* (2019.01); *G07C 15/006* (2013.01); *G07F 17/329* (2013.01)

(58) Field of Classification Search
CPC ...... G07F 17/329; A63F 3/0665; A63F 3/068; A63F 3/065; A63F 3/0605; B42D 25/27; Y10S 283/903
See application file for complete search history.

(56) References Cited

U.S. PATENT DOCUMENTS

| | | | |
|---|---|---|---|
| 7,383,099 B2 * | 6/2008 | Pollard | G07F 17/32 700/232 |
| 9,339,121 B2 | 5/2016 | Siciliano et al. | |
| 10,071,848 B2 * | 9/2018 | Ghia | B65D 83/12 |
| 10,235,843 B2 * | 3/2019 | Ghia | G07F 17/329 |
| 10,403,088 B2 * | 9/2019 | Ghia | G07F 17/329 |
| 10,431,048 B2 * | 10/2019 | Ghia | G07F 17/3248 |
| 10,559,162 B2 * | 2/2020 | Ghia | G07F 17/329 |
| 2009/0101714 A1 * | 4/2009 | Weyler, III | G07F 17/329 235/385 |

(Continued)

FOREIGN PATENT DOCUMENTS

EP    3 264 376 A1    1/2018

OTHER PUBLICATIONS

EPO Search Report, dated Jan. 2, 2020.

*Primary Examiner* — Jay Trent Liddle
(74) *Attorney, Agent, or Firm* — Dority & Manning, P.A.

(57) ABSTRACT

A lottery ticket dispensing system includes an array having bins that dispense a pack of scratch-off lottery tickets, wherein each ticket includes game play characters covered by a scratch-off coating. A pack code for each ticket pack is associated with a computer database file maintained by a central server that includes identification of some of the game play characters for each of the tickets in the pack and location of the pack. A display is in communication with the central server and, based on ticket location information from the central server, is configured to reveal to players the game play characters of at least certain ones of the scratch-off lottery tickets remaining in the array.

15 Claims, 5 Drawing Sheets

(56) References Cited

U.S. PATENT DOCUMENTS

2014/0046481 A1* 2/2014 Siciliano ................ A47F 1/125
  700/236
2014/0304096 A1* 10/2014 Devineni ............. G06Q 10/087
  705/22
2017/0018148 A1* 1/2017 Behm .................... G06Q 20/18
2017/0053472 A1 2/2017 Ferron et al.
2019/0340865 A1* 11/2019 Martineck, Sr. .... G07F 17/3227

* cited by examiner

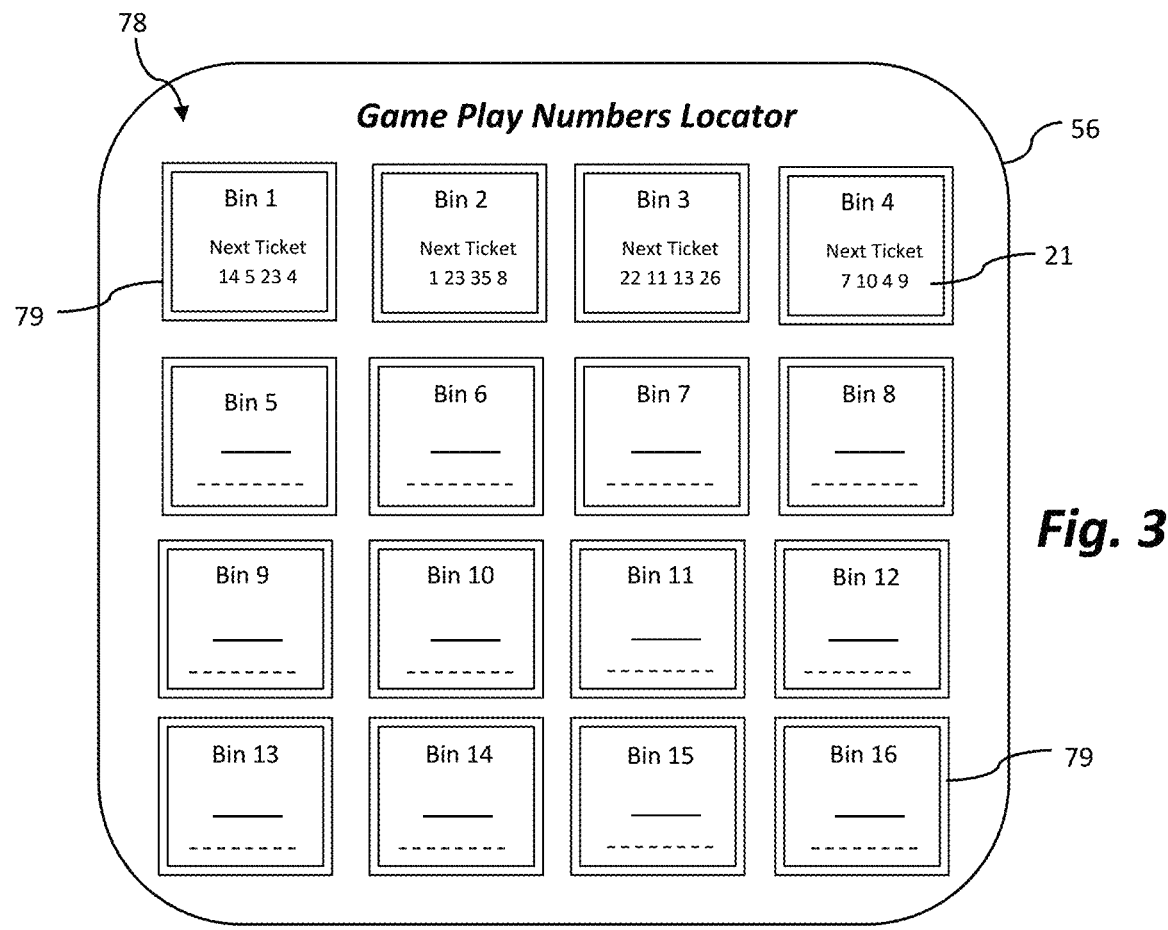
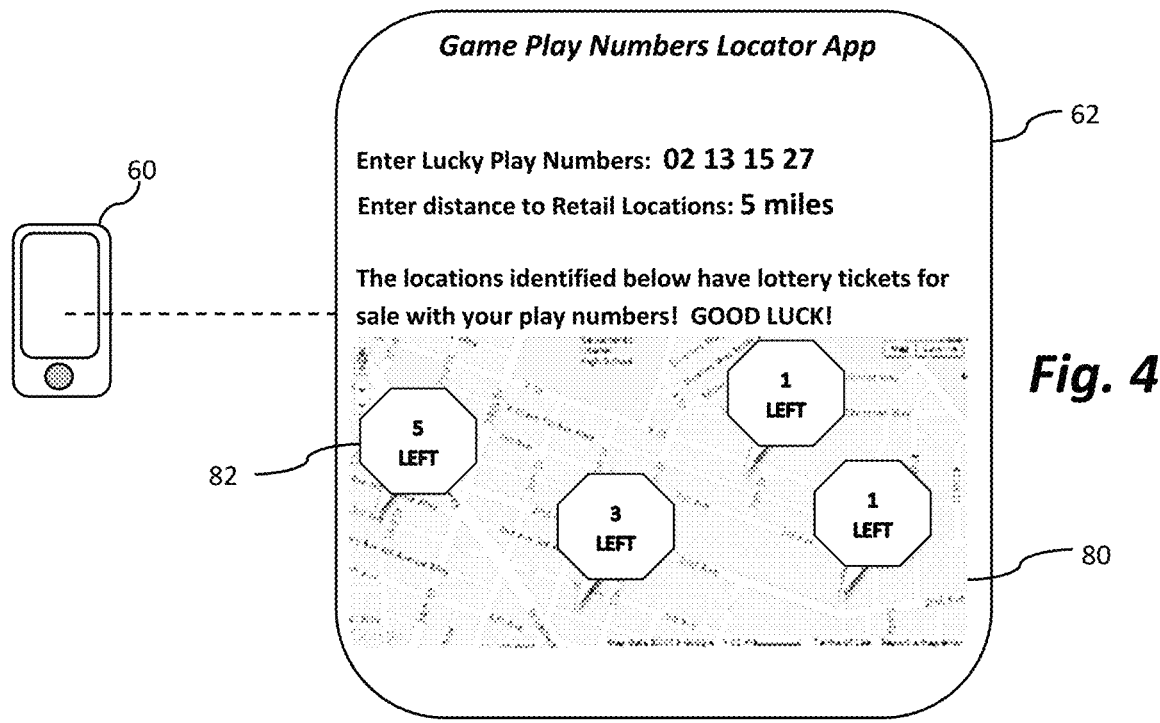

SYSTEM AND METHOD FOR PROVIDING PLAYERS WITH LOCATION OF LOTTERY TICKETS WITH SPECIFIC GAME PLAY CHARACTERS

BACKGROUND

Instant lottery tickets (e.g., "scratch-off" lottery tickets) are sold at many types of retail locations including, stores, such as grocery stores, general merchandise stores, and the like. Various configurations of lottery ticket dispensers have been proposed in the industry for this purpose, including electronic dispensers that automatically dispense a ticket from a bin or compartment upon receipt of an electronic command signal.

For example, U.S. Pat. No. 9,339,121 proposes an electronic lottery ticket dispensing system that includes a plurality of lockable ticket compartments that each dispenses a ticket upon receipt of a dispense trigger signal from a computing device. Inside each ticket compartment resides a dispensing mechanism and an associated motor that actuates the dispensing mechanism. The dispensing mechanism advances at least one ticket from a continuous perforated fan fold stack of scratch-off lottery tickets. A logic circuit is in communication with the motor, controls motor actuation, and records the number of tickets dispensed. There is also an interface between the logic circuit and a computing device that records the number of tickets sold from the respective compartments. The exterior of the ticket dispenser includes a numeric display that indicates the number of tickets remaining in the ticket compartment. This display is adjacent the dispensing slot and, thus, not visible to the purchaser.

It has been found that many lottery players are, to some extent, superstitious and purchase lottery tickets according to certain superstitious beliefs. For example, some players will only purchase tickets on a certain day of the week, or date in a month. Certain players may wear a "lucky" clothing item when purchasing tickets, and so forth. Still further, many players have a lucky number, and are inclined to integrate this number into games of chance. For example, players will play certain lucky numbers in conventional Pick-3 or Pick-5 drawn games.

With conventional instant scratch-off lottery tickets that embody match-type games, generally, a set of game play indicia in the form of alpha-numeric characters, symbols, or other characters are provided on each ticket and may be covered by a scratch-off coating. A separate plurality of player indicia is provided on the ticket and also covered by a scratch-off coating. The game is played by the player removing the coating from the game play indicia to revel such indicia, and then removing the coating from the player indicia to determine if the player indicia contain one or more matches with the game play indicia, wherein the number of matches determines the winning status of the lottery ticket. Various other game play styles are just as applicable.

However, to date, players have been unable to integrate their lucky numbers into selection and play of scratch-off lottery tickets. There has been no feasible means to inform players as to what the game play indicia might be on any given scratch-off lottery ticket before purchase of the ticket so that the player has the option to filter or select tickets that contain their lucky play numbers or symbols. For example, the display and logic circuitry of the '121 patent discussed above do not provide players with any insight into the game play indicia that the tickets in the compartment might contain.

The gaming industry would benefit from a system and method that conveys to players the location where instant scratch-off lottery tickets having specific game play indicia are available for purchase. Such a system and related method would appeal to a particular class of players, increase ticket sales, and drive more foot traffic to the retail establishments that sell the lottery tickets.

SUMMARY

Objects and advantages of the invention will be set forth in part in the following description, or may be obvious from the description, or may be learned through practice of the invention.

In accordance with aspects of the invention, a lottery ticket dispensing system and associated method of operation are provided for dispensing instant scratch-off lottery tickets at a retail establishment. The type of retail establishment may vary widely within the scope and spirit of the invention. For example, in certain embodiments, the retail establishments may be convenience stores, gas stations, pubs, and any other establishment that is authorized to sell lottery tickets to the public. The present dispensing system has particular usefulness for much larger retail establishments, such as "big-box" retail stores that are part of a national or other geographic chain, wherein the sale of lottery tickets has generally not been implemented.

The present dispensing system and method are uniquely configured to notify players of game play indicia on scratch-off lottery tickets prior to purchase of the tickets. In this way, the player has the ability and option to screen the tickets and purchase tickets having the player's preferred (e.g., "lucky") game play indicia.

The system includes a dispenser array at the retail establishment, the array having one or more bins each configured to house and dispense a pack of the scratch-off lottery tickets, wherein each of the lottery tickets includes a set of game play indicia covered by a scratch-off coating, as is well-known in the art. The term "game play characters" is used herein to encompass any manner of the game play indicia, such as symbols, numbers, letters, and so forth.

A scanner is associated with the array and is configured to read a ticket pack code assigned to each of the packs of lottery tickets loaded into the array. This code may be provided, for example, on an insert card or label on the ticket pack. The ticket pack code may also be provided on the first lottery ticket in the pack. Each ticket pack code is associated with a computer database file that includes identification of some (one or more, but not all) of the game play characters for each of the lottery tickets in the pack, as well as the location of the ticket pack, which may include the retail establishment and specific bin within the array. A security risk would be created if the file contained all of the game play characters for each ticket, as well as the location of the pack.

A central server is in communication with the scanner (directly or via a controller or other device associated with the array) and configured for receipt of a signal that includes the ticket pack code and identifies the specific bin location of the pack in the array. This information is stored in the computer database file.

A display, such as an LCD monitor screen or the like, is configured at the retail establishment, preferably within viewing proximity of the array. In one embodiment, the display may be integrated with a lottery kiosk at the retail establishment. The display is configured in communication with the central server and, based on ticket location information received from the central server, reveals to the players one or more (but not all) of the game play characters of at least certain ones of the lottery tickets remaining in the array. Thus, based on this information, the player can base their decision to purchase one of the lottery tickets at least in part on having knowledge of at least one or more of the game play characters that may otherwise be covered by the scratch-off coating on the lottery ticket.

In a particular embodiment, the display may be configured to reveal the game play characters for the lottery ticket to be dispensed next from one or more of the bins in the array. For example, the player may be presented with a visual representation of the array on the display, wherein the game play characters for the next lottery ticket in each of the bins is provided in the visual representation.

In still a further embodiment, the display may be provided as an interactive device, such as a kiosk with a player interface, wherein the player inputs game play characters of their choice. This information is conveyed to the central server, which then searches the ticket packs within the array for the game play characters chosen by the player and relays the results to the display. The display then provides the player with the location in the array of one or more of the lottery tickets having the game play characters chosen by the player. This information from the display may also include the specific location of the lottery ticket within the specific bin. For example, the player may be informed that a lottery ticket containing their chosen game play characters is located in the fourth bin in the array and is the sixth ticket in the bin. If the player desires this particular lottery ticket, he will need to purchase six tickets from the identified bin.

The scanner used to input the ticket pack code may be variously configured. For example, the scanner may be a single, central scanner associated with the array and common to all of the bins in the array. Once the ticket pack code is read by the scanner, other means can readily be used to associate the code with the particular bin in which the pack is placed. For example, the retail clerk may manually input such bin identification into a controller, or use the scanner to scan a code fixed on the bin, and so forth. In an alternate embodiment, each bin is configured with an individual scanner used to scan the ticket pack code, and each scanner has a unique ID signal component tagged to the ticket pack code transmitted to the central server. With this embodiment, a code provided on the first lottery ticket within the ticket pack may function as the ticket pack code.

Other unique system and method configurations in accordance with the invention are based on utilization of mobile smart devices, such as a smart phone, tablet, computer, and so forth, to provide the display and interactive functionalities (and other functionalities). With these embodiments, a display is enabled on a player's mobile smart device, which is in communication with the central server via a downloaded computer application running on the smart device. Based on ticket location information from the central server and a specific inquiry from the player, the application is configured to reveal to the players via the display location of one or more retail establishments having one or more of the lottery tickets for sale with the game play characters chosen by the player.

For example, the application may be interactive, wherein the player inputs game play characters of their choice via the mobile smart device. The player's selection is transmitted to the central server, which conducts a search of the database file for lottery tickets containing the player's selected game play characters. This search may be limited to ticket packs within a defined geographic region, such as within a defined radius of the player's current location determined by a GPS functionality of the mobile smart device. The application and display are configured to provide the results to the player in the form of the location of one or more retail establishments having one or more of the lottery tickets for sale with one or more of the game play characters chosen by the player. The results may also convey to the player the specific bin and ticket location within the bin for the particular retail establishments.

The "character" may be a special character not associated with the main theme of the ticket. This character may be a symbol that is sought by players to add to their collection of symbols and once the player has assembled a complete set, then the player wins some type of prize. For example, the player may be seeking Monopoly properties in order to complete a set of such properties to win or qualify for a prize.

In certain embodiments, it may be desirable to initially only convey to the player location of the retail establishments that have one or more of the lottery tickets remaining for sale that contain the player's chosen game play characters. Once the player enters one of the locations, the remaining information regarding bin and ticket location can then be provided, as discussed below. This scenario might encourage more widespread player foot traffic to the various retail establishments, which is beneficial to the retail establishment business.

In a particular system and method configuration, the application running on the mobile smart device enables recognition and receipt by the smart device of a unique ID signal emitted by a transmitter located at the retail establishment. Once the player is within the retail establishment and within range of the transmitter device, the bin within the array containing the lottery ticket having the game play characters chosen by the player is revealed to the player via the mobile smart device or a display in the retail establishment. The signal is unique to the retail establishment and transmitted to the central server by the mobile smart device, which uses the store identification to further filter the search results to the particular retail establishment in order to provide the specific bin and ticket location within the bin to the player via their mobile smart device or another display within the retail location, such as a stand-alone monitor or screen in the retail establishment or a display configured with a lottery terminal kiosk in the retail establishment. The transmitter in this embodiment may be a Bluetooth Low Energy (BTLE) beacon that emits a BTLE ID signal unique to the retail establishment, wherein the application running on the mobile smart device receives the BTLE ID signal and transmits all or a portion of the BTLE ID signal to the central game server.

In an alternate embodiment, the application running on the player's mobile smart device transmits an ID signal unique to the mobile smart device which can be detected by a receiver at the retail establishment once the player is within the retail establishment and within range of the receiver. This unique player ID is transmitted to the central server by a controller or other lottery hardware component at the retail establishment, wherein the server uses the player ID and store locator signal to further filter the search results to the particular bin and ticket location within the bin in order to provide the specific bin and ticket location within the bin to the player via their mobile smart device or other display within the retail establishment, such as a stand-alone monitor or screen in the retail establishment or a display configured with a lottery terminal kiosk in the retail establishment.

It should be appreciated that the player may perform the steps of querying the central server as to retail establishment locations having lottery tickets satisfying the player's game play character criterion while the player is within a particular retail establishment. If such establishment indeed has one of the lottery tickets, the information regarding bin and ticket location within the bin may be automatically downloaded to the player once the central server receives the player and/or establishment location, as discussed above.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

FIG. 3 depicts a display that reveals game play characters of scratch-off lottery tickets for sale in an associated dispenser array;

FIG. 4 depicts a mobile smart device embodiment of the present system and method;

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
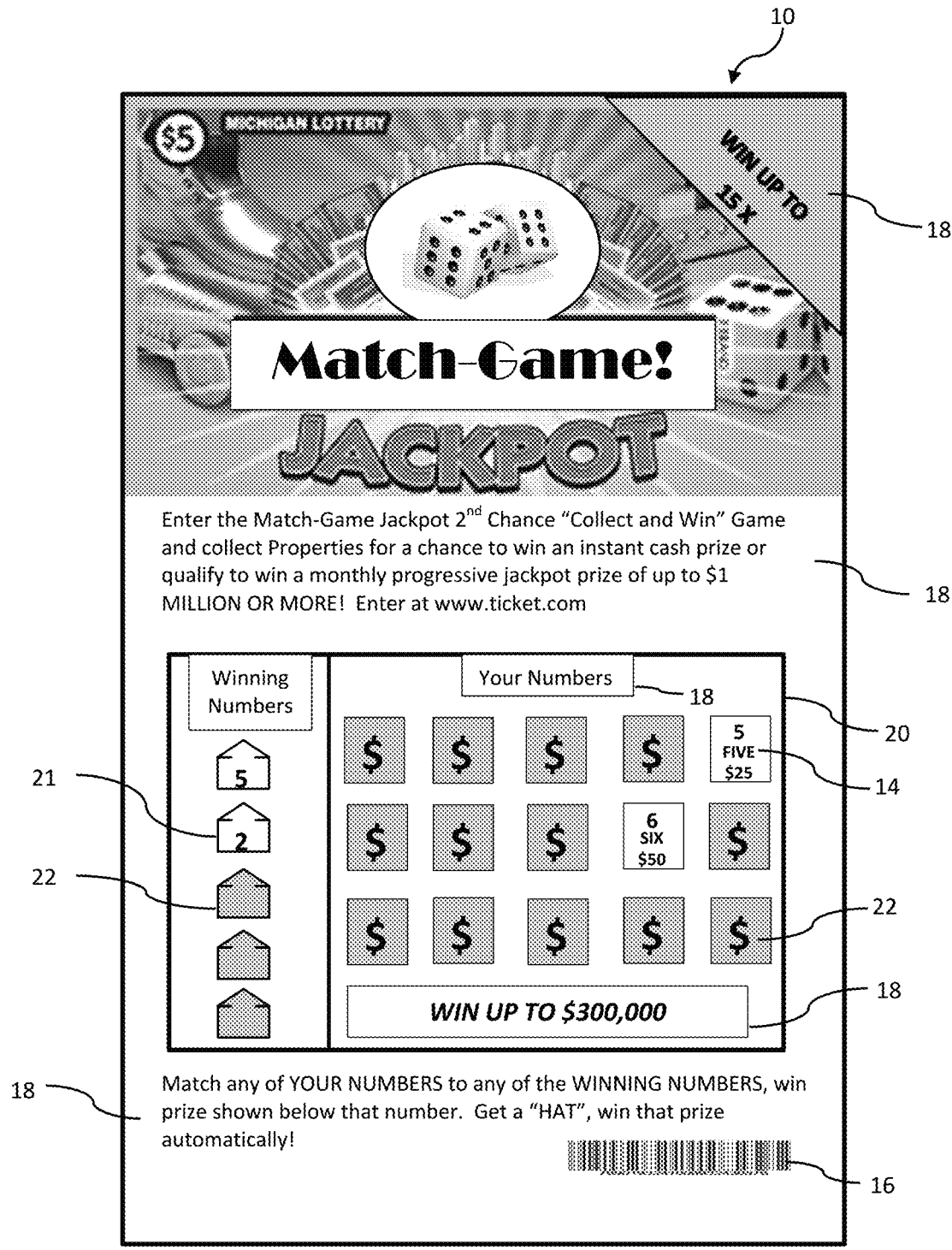
FIG. 1 is an illustration of a conventional scratch-off lottery ticket

FIG. 1 illustrates an exemplary scratch-off ("instant") lottery ticket 10. As is well-known, such tickets 10 include game instruction graphics and indicia 18 that explain to a player how to play the game embodied on the ticket 10, as well as what constitutes a winning ticket and the prize amounts. The game instruction indicia 18 may be considered as "static" indicia in that, for a given game, it does not change from one ticket to the other.

Each scratch-off lottery ticket 10 also includes a game play area 20 wherein game play characters 21 are provided and covered by a scratch-off coating (SOC) layer 22. In the illustrated embodiment, the characters 21 are numbers. In other embodiments, the characters 21 could be letters, symbols, or the like. In order to reveal the winning or losing status of the ticket 10, the player removes the coating 22 to uncover the underlying game play characters 21. Thus, the game play characters 21 may be considered as "variable" indicia in that it changes from one ticket 10 to another.

Many lottery players have lottery numbers or symbols that they consider as lucky but, to date, have been unable to play such numbers or symbols as game play characters 21 in the realm of scratch-off lottery tickets.

Still referring to FIG. 1, with most conventional scratch-off lottery tickets 10, the game embodied on the ticket is based on matching other characters on the ticket 10 with the game play characters 21. For example, in FIG. 1, the player is presented with a matrix of "Your Numbers" 14 in the right-hand side of the game player area 20 that simulate random numbers generated for the player. The instructions 18 explain that a match of any of the "Your Numbers" 14 with any of the "Winning Numbers" (game play characters 21) wins the prize show below the number, as well as other prize potentials. Additional game instruction indicia 18 instructs the player on how to enter a second-chance game.

Each ticket 10 includes a ticket-specific code 16 printed thereon that is typically covered by a scratch-off coating, such as a scanable barcode (as depicted in the figures) or alpha-numeric code. The ticket-specific code 16 is linked (e.g., via a secure algorithm) to a stored computer file associated with the ticket 10 (a validation file accessible by a central game server). Once the code 16 is scanned upon being purchased and received by the game server, the ticket 10 may be flagged as "activated" in the lottery system.

Figure 2:
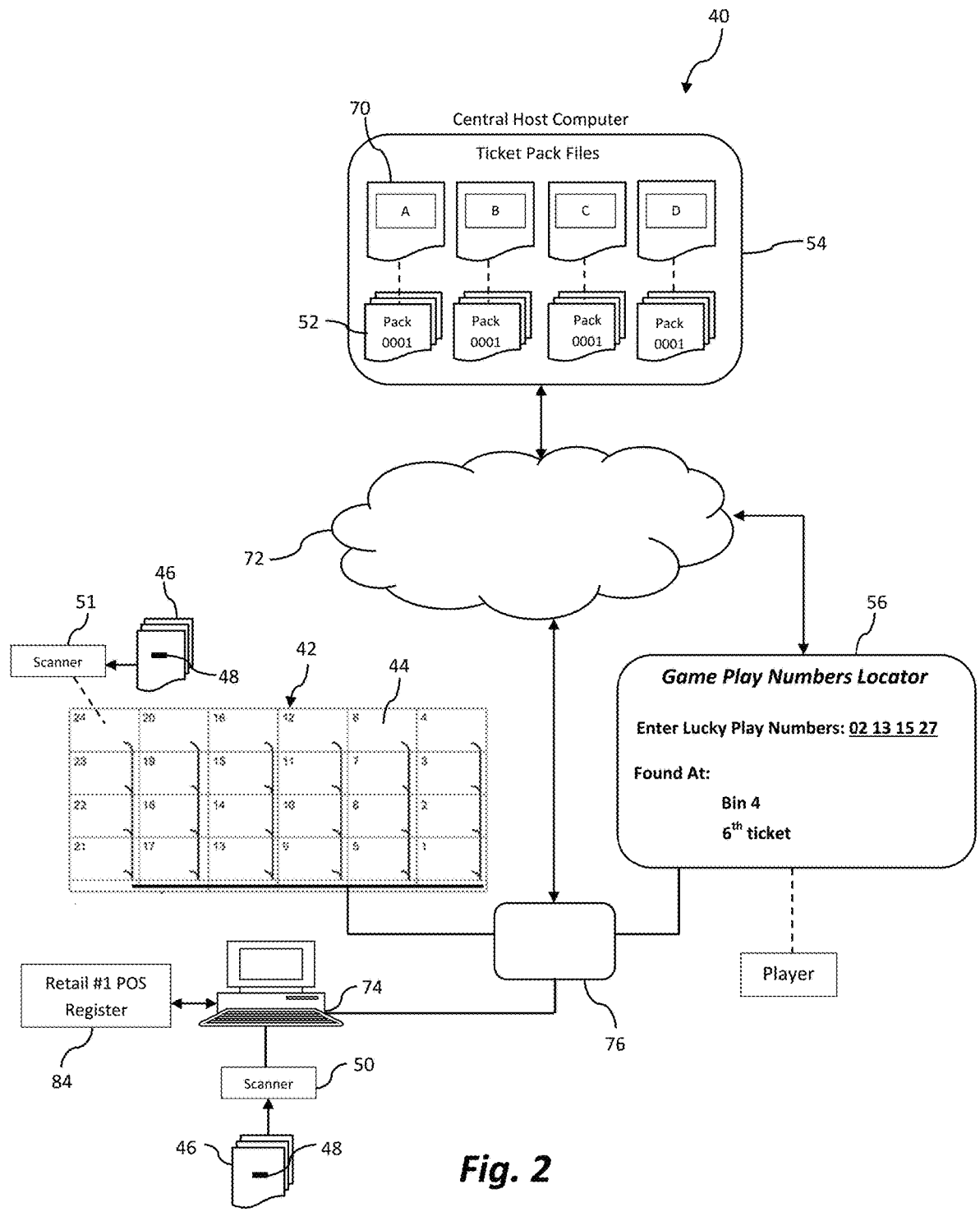
FIG. 2 is a diagram of a lottery ticket dispensing system and method in accordance with aspects of the present invention.

FIG. 2 depicts an embodiment of a system and related operational method 40 for dispensing the scratch-off lottery tickets 10 at a retail establishment. As mentioned above, the type of retail establishment may vary widely within the scope and spirit of the invention. A retail establishment, such as a retail store, convenience store, pub, restaurant, or the like, is generally authorized by a lottery jurisdiction to carry out lottery activities, such as the sale of instant scratch-off tickets 10 or terminal printed draw tickets for games such as Powerball™ game tickets. The lottery jurisdiction may be a state lottery authority, such as the Pennsylvania Lottery, or any other governmental jurisdictional authority. A separate game provider may be partnered with the lottery jurisdiction to provide certain control, implementation, and logistical functions of the game. It should be appreciated that the type of retail establishment or lottery jurisdiction entities are not limiting factors of the invention. Although not limited to such, the present system 40 has particular usefulness for larger retail establishments, such as "big-box" retail stores that are part of a national or other geographic chain, or corporation stores such as "7-11" convenience stores.

The retail establishment includes one or more retail point-of-sale (POS) registers 84 wherein patrons of the establishment purchase goods. Typically, a scanner is associated with the POS register 84 to scan a UPC code on the products, with the UPC code linked to a purchase price and identification of the products, as is well-known in the art.

In the embodiment of FIG. 2, a lottery ticket terminal 74 is provided and may be configured in wired or wireless communication with the retail POS register 84 to accept a request for purchase of a particular scratch-off lottery ticket 10 selected from a plurality of different lottery tickets 10 made available to patrons (players) for purchase. This request may be input directly to the terminal 74 or come via the POS register 84. Various types of lottery ticket terminals 74 are known in the art and suitable for configuration with a system 40 in accordance with the invention. For example, Scientific Games Corporation having a principal place of business in Alpharetta, Ga., USA, offers Flair™ and Wave™ lottery ticket terminals that may be readily configured by those skilled in the art for a system as described herein.

A patron's request for a particular scratch-off lottery ticket may be input into the lottery ticket terminal 74 by a retail clerk or other employee of the retail establishment by various means. For example, the terminal 74 may be configured with a scanner 50, wherein the clerk scans a "master" card having a code corresponding to the lottery ticket 10 from a particular game requested by the patron. Thus, a master card or master code would be provided for each type of lottery ticket 10 offered by the retail establishment. In another embodiment, the terminal 74 may be configured with a touch-screen, keyboard, or other data input device, wherein the clerk enters or identifies the ticket 10 requested by the patron. The purchase code is routed from the terminal to the ticket-specific bin 42 directly or via a controller 76.

In an alternate embodiment, the ticket purchase signal that is eventually routed to the specific bin 44 in the array 42 is generated by the POS register 84 and transmitted to the controller 76 after the POS register 84 receives a purchase code from the lottery ticket terminal 74 corresponding to the particular ticket requested by the patron.

Still referring to the embodiment of FIG. 2, a lottery ticket dispenser array 42 is in wired or wireless communication with the terminal 74. This dispenser array 42 includes one or a plurality of individual lottery ticket bins 44, with each bin 44 typically containing a different respective lottery ticket game. For example, one bin 44 may contain "Lucky 7" themed scratch-off lottery tickets 10, while an adjacent bin 44 may contain "Gold Rush" themed scratch-off lottery tickets 10, and so forth.

Each lottery ticket 10 in the different bins 44 includes the machine readable code 16 printed on a front or back side thereof, such as an alpha-numeric code, bar code, QR code, or the like. The type of code 16 may vary depending on the desired information content of the code, space on the ticket 14, and so forth. The use of such codes 16 on scratch-off lottery tickets 10 for various functions related to inventory, identification, verification, and security are well-known.

The lottery tickets 10 in each bin 44 are generally loaded as a fan-folded stack or roll (collectively referred to herein as a "ticket pack" 46) of sequentially numbered tickets 10, wherein the machine readable code 16 on each lottery ticket 10 contains this ticket identification number (as well as any manner of additional ticket information), for example in the form of a serial number embedded in the code 16.

Although not shown in detail in the figures, each bin 44 in the dispenser array 42 includes an electronic drive mechanism that, when activated in response to a command signal, dispenses one or more lottery tickets 10 from the bin 44 (depending on the number of tickets requested by the patron). The drive mechanism may include a motor that drives a friction roller, wherein the tickets 10 are engaged between the friction roll and an idler roll such that driven rotation of the friction roll causes the tickets 10 to be advanced through a dispensing slot in a wall of the individual bin 44.

In the illustrated embodiment of FIG. 2, each bin 44 also includes a scanner 51 disposed so as to read the code 16 on the lottery tickets 10 as they are dispensed from the bin 44. These individual scanners 51 may be any conventional barcode reader, such as a point scanner, linear scanner, laser scanner, LED image scanner, and so forth, as well as other types of character recognition systems. The tickets 10 are loaded into the bins 44 such that the code 16 printed on each ticket passes within the detection field of the scanner 51.

The controller 76 depicted in FIG. 2 is interfaced with the dispenser array 42 and the lottery terminal 74. This controller 76 may be any combination of hardware and software components that serves to control and coordinate the various functionalities of the dispenser array 42 and terminal 74. The controller 76 may be integrated with the terminal 74, with the array 42, or may be a stand-alone unit.

The controller 76 is also in communication with a central lottery server 54 directly or via a communications network 72. This central lottery server 54 may be common to a number of different retail establishments. As described above, as the tickets 10 are dispensed from a bin 44, the scanner 51 reads the code 16 printed on each ticket 10 and a signal corresponding to the scanned code is routed to the central lottery server 54 for each lottery ticket dispensed from the dispenser array 42 to enable certain actions relevant to the sale/dispensing, activation, and redemption/validation of the individual tickets 10.

It should be appreciated that the terms "server" is used herein to encompass any configuration of computer hardware and software that is maintained by a lottery authority or game provider to carry out the functionalities of the present system 40 and associated method, as well as any manner of additional lottery functions known to those skilled in the art. It should be readily appreciated that the server 54 may include an integrated server, or any manner of periphery server or other hardware structure. The central lottery server 54 is typically remote from the retail establishments, and is in communication with the establishments via a suitable secure communication network 72, which may include any manner of wide area network, wireless internet, or cloud computing. The server 54 may be a single networked computer, or a series of interconnected computers having access to the communications network via a gateway or other known networking system. Generally, the server 54 is configured to communicate with, manage, execute and control individual lottery terminal units 74 within the lottery jurisdiction. The server 54 may be a "front end" server provided by the lottery game provider that is interfaced with the existing draw/instant game system infrastructure one or more separate lottery authorities. The server 54 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 40.

The server 54 may be directly or indirectly connected through an I/O bus to any manner of peripheral devices such as storage devices, wireless adaptors, printers, and the like. In addition, a database (DB) may be communicatively connected to the server 34 and provide a data repository for the storage and correlation of information gathered from the individual dispenser arrays 42, such as the identity of each lottery ticket 10 dispensed from the array, the time of the dispense sequence, confirmation of ticket activation, and so forth.

As mentioned above, the scratch-off lottery tickets are provided to the dispenser array 42 in the form of a ticket pack 46. Each of these packs 46 contains a pack code 48 that uniquely identifies the pack 46 to the central server 54. The code 48 may be provided, for example, on an insert card or label on the ticket pack 46, wherein the code 48 can be scanned by the central scanner 50 when the pack 46 is loaded into a bin 44. Once the ticket pack code 48 is read by the scanner 50, other means can readily be used to associate the code 48 with the particular bin 44 in which the pack 46 is placed. For example, the retail clerk may manually input such bin identification into the controller 76 via the lottery terminal 74, or use the scanner 50 to scan a code fixed on or otherwise associated with the bin 44.

In an alternate embodiment, the ticket pack code 48 may also be provided on the first lottery ticket 14 within the pack 46. In this case, the individual scanner 51 configure with each bin 44 can be used to scan the ticket pack code 48, wherein the code 48 is transmitted to the central server 54 with a tag that is unique to the bin scanner 51 (and thus identifies the bin 44 in which the pack 46 was loaded).

Referring to FIG. 2, each ticket pack code 48 is associated with a computer database file 52 that includes identification of some (but not all) of the game play characters for each of the lottery tickets 14 in the pack 46. In FIG. 2, the central server 54 maintains the database for various games 70 (e.g. Game A "Lucky 7", Game B "Gold Rush", and so forth). With each game 70, multiple ticket packs 46 are distributed to the various retail establishments. Each pack is associated with a respective file 52, wherein the file 52 includes some of the game play characters 21 for all or some of the lottery tickets 10 in the pack 46. For example, the file 52 may contain a searchable list of the tickets 10 by serial number or other identification, wherein each serial number includes a sub-file with the game play characters 21 for the specific ticket 14

A display 56, such as an LCD monitor screen or the like, is configured at the retail establishment, preferably within viewing proximity of the array, and is in communication with the central server 54 directly or via the controller 76 or other means. The display 56 may be integrated with a lottery kiosk 58 (FIG. 6) at the retail establishment. Based on ticket location information received from the central server 54, the display 56 is configured to reveal to the player the game play characters 21 of at least certain ones of the lottery tickets 14 remaining in the array 42. Thus, based on this information, the player can base their decision to purchase one of the lottery tickets 10 at least in part on having knowledge of the game play characters 21 that may be covered by the scratch-off coating 22 on the lottery ticket.

The manner and amount of revealing the game play characters 21 can vary within the scope of the present system and method 20. For example, referring to FIG. 3, the display 56 may be configured to reveal the game play characters 21 for the lottery ticket 10 to be dispensed next from one or more of the bins 44 in the array 42. For example, the player may be presented with a visual representation 78 of the array with a matrix 79 of the various bins, wherein the game play characters 21 for the next lottery ticket in each of the bins 44 is provided in the visual representation 78.

Referring to FIG. 2, in still a further embodiment, the display 56 may be provided as an interactive device, such as a kiosk 58 (FIG. 6) with a player interface, wherein the player inputs certain game play characters of their choice. This information is conveyed to the central server 54, which then searches the ticket packs 46 within the array 42 for the game play characters 21 chosen by the player and relays the results to the display 56. The display 56 then provides the player with the location in the array 42 of one or more of the lottery tickets 10 having the game play characters 21 chosen by the player. For example, the display may identify one or more bins 44 within the array containing a ticket 10 matching the player's criteria, wherein the player can purchase tickets 10 from the identified bin 44 in the hopes of obtaining such ticket 10. Alternately, the information from the display may also include the specific location of the lottery ticket 10 within the specific bin 44, as indicated in FIG. 2 where the player is informed that a lottery ticket 10 containing their chosen game play characters 21 is located in the fourth bin 44 in the array 42 and is the sixth ticket in the bin 44. If the player desires this particular lottery ticket 10, he will need to purchase six tickets from the fourth bin 44 or wait for others to purchase five tickets in front of him.

Figure 5:
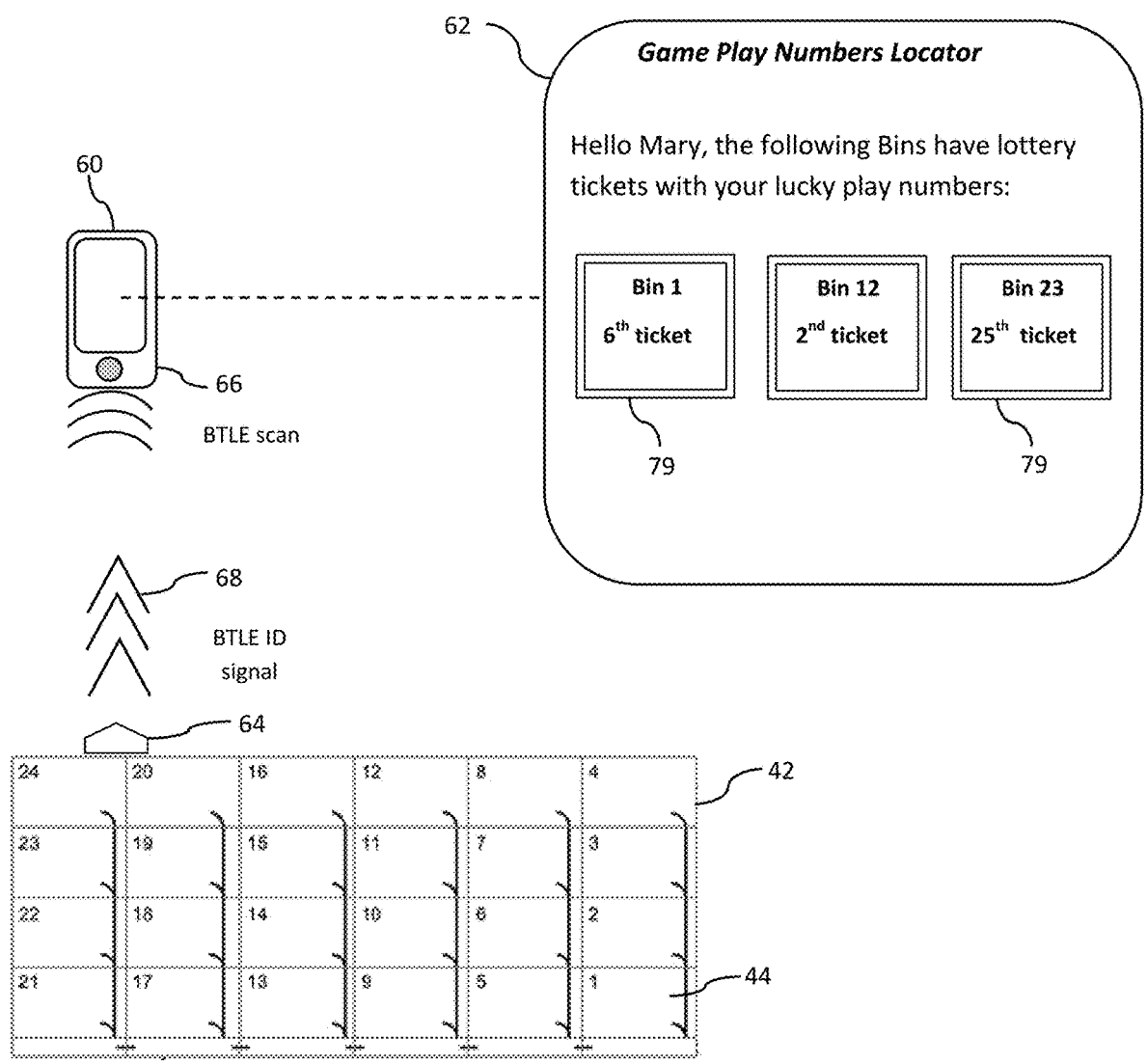
FIG. 5 is a diagram of a mobile smart device embodiment of the present system and method.
Figure 6:
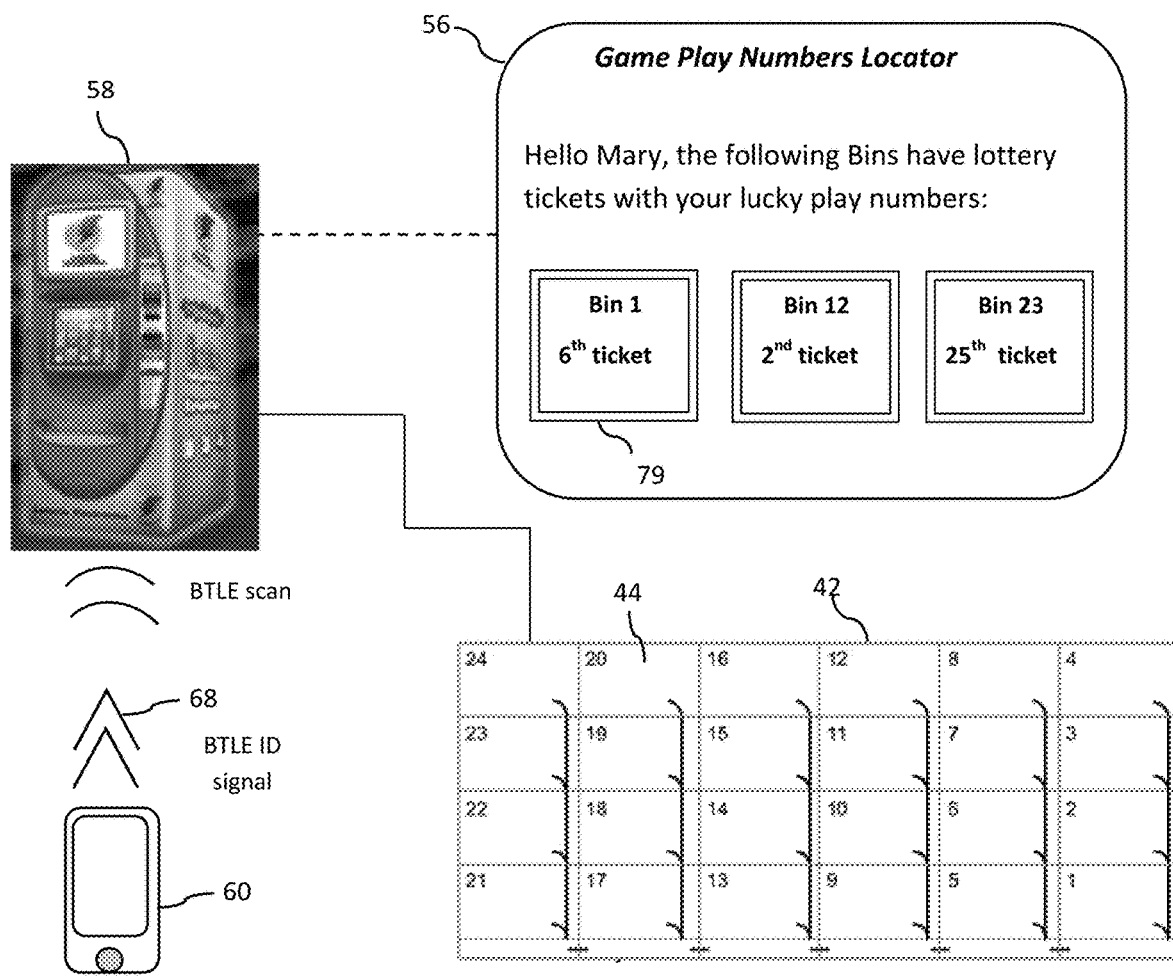
FIG. 6 is a diagram of an alternate embodiment of a mobile smart device embodiment.

FIGS. 4 through 6 relate to unique system and method configurations in accordance with the invention based on utilization of mobile smart devices 60, such as a smart phone, tablet, computer, and so forth, to provide the display and interactive functionalities (and other functionalities). With these embodiments, a display 62 is enabled on a player's mobile smart device 60, which is in communication with the central server 54 via a downloaded computer application running on the smart device 60. Based on ticket location information from the central server 54, the application is configured to reveal to the players via the display 62 certain game play characters 21 of at least certain ones of the lottery tickets 10 remaining in a particular array 42 at a particular retail establishment.

Referring for example to FIG. 4, in a particular embodiment, the application on the mobile smart device 60 is interactive and the player inputs game play characters 21 of their choice via the mobile smart device 60. These game play characters may belong to the set of "winning numbers" or to the set of "your numbers" on the ticket, but will not be searched for both. The player's selection is transmitted to the central server 54, which conducts a search of the database files 52 for lottery tickets 10 containing the player's selected game play characters 21. This search may be limited to ticket packs within a defined geographic region, such as within a defined radius of the player's current location determined by a GPS functionality of the mobile smart device, as indicated in FIG. 4. The application and display 62 are configured to provide the results to the player in the form of the location of one or more retail establishments having one or more of the lottery tickets 10 for sale with the game play characters 21 chosen by the player. The results may also convey to the player the specific bin 44 and ticket location within the bin 44 for the particular retail establishments. For example, in FIG. 4, the display 62 provides a map 80 relative to the player's current GPS position wherein four retail establishments are identified by icons 82, with each icon revealing the number of tickets 10 at the respective retail establishment matching the player's criteria.

In certain embodiments, it may be desirable to initially only convey to the player location of the retail establishments that have one or more of the lottery tickets 10 remaining for sale that contain the player's chosen game play characters 21, as in the display of FIG. 4. Once the player enters one of the establishments, the remaining information regarding bin 44 and ticket location within the bin 44 can then be provided to the player. This scenario should result in increased player foot traffic to the various retail establishments, which is beneficial to the retail establishment business.

Referring to FIG. 5, in a particular system and method configuration, the application running on the mobile smart device 60 enables recognition and receipt by the smart device 60 of a unique ID signal 68 emitted by a transmitter 64 located at the retail establishment. Once the player is within the retail establishment and within range of the transmitter device 64, the bin 44 within the array 42 containing the lottery ticket 10 having the game play characters 21 chosen by the player is revealed to the player via the mobile smart device 60. The signal 68 is unique to the retail establishment and is transmitted to the central server 54 by the player's mobile smart device 60, which uses the store identification to further filter the search previous results to the particular retail establishment in order to provide the specific bin 44 and ticket location within the bin 44 to the player. This information may be revealed to the player via their mobile smart device 60 or another display 56 within the retail location, such as a stand-alone monitor or screen in the retail establishment or a display configured with a lottery terminal kiosk 58 in the retail establishment.

Any suitable Near-Field Communication (NFC) implementation may be used in the above embodiment between the player's mobile smart device 60 and the lottery system components in the retail establishment. For example, the transmitter 64 may be a Bluetooth Low Energy (BTLE) beacon that emits a BTLE ID signal unique to the retail establishment, wherein the application running on the mobile smart device 60 is BTLE-enabled and receives the BTLE ID signal 68 and transmits all or a portion of the BTLE ID signal 68 to the central game server 54, thereby notifying the server 54 that the player is in a specific retail establishment.

BTLE devices are well-known, and a detailed explanation of their function and operation is not necessary for an understanding and appreciation of the present invention. Briefly, BTLE beacons are a class of low-energy, low-cost radio transmitters that can notify mobile smart devices (e.g., iOS 7 smart phones) running BTLE applications of their presence, which in turn enables the smart device to perform certain actions when in close proximity to the beacon. These devices are often referred to as "iBeacons", which is the name Apple chose for its implementation of the BTLE technology. Each BTLE beacon broadcasts a unique identification signal using the BTLE standard format. These signals are also known as iBeacon "advertisements." The mobile smart device runs a background application that enables the device to scan for and receive the signals within transmitting range of the BTLE beacons. The mobile smart device will automatically "react" to the received signal and may start other BTLE-enabled applications for various purposes, including communication with the central server.

In an alternate embodiment depicted in FIG. 6, the application running on the player's mobile smart device 60 transmits an ID signal 68 unique to the mobile smart device 60 which can be detected by a receiver at the retail establishment (e.g. a received integrated with a kiosk 58) once the player is within the retail establishment and within range of the receiver. This unique player ID 68 is transmitted to the central server 54 by a controller 76 (FIG. 2) or other lottery hardware component at the retail establishment (such as the kiosk 58), wherein the server 54 uses the player ID 68 and store identification provided by the transmitting device to further filter the search results to the particular bin 44 and ticket location within the bin 44 in order to provide the specific bin 44 and ticket location within the bin 44 to the player. This information may be revealed to the player via their mobile smart device 60 or another display 56 within the retail location, such as a stand-alone monitor or screen in the retail establishment or a display configured with the lottery terminal kiosk 58 in the retail establishment.

It should be appreciated that embodiments of the methods and systems 20 disclosed herein may be executed by one or more suitable networked lottery gaming components and establishment components (e.g., POS register, back office server, and so forth) within a plurality of the establishments, as well as the remote central server. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

As mentioned above, aspects of the present systems and methods 20 rely on the transmission of data over one or more communications networks. It should be appreciated that network communications can comprise sending and/or receiving information over one or more networks of various forms. For example, a network can comprise a dial-in, public switched telephone network (PSTN), a local area network (LAN), wide area network (WAN), the Internet, an intranet or other type of network. A network may comprise any number and/or combination of hard-wired, wireless, or other communication links.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A lottery ticket dispensing system configured to reveal one or more game play characters on scratch-off lottery tickets to players prior to purchase of the scratch-off lottery tickets, comprising:
   a dispenser array at a retail establishment, the dispenser array having one or more bins each configured to house and dispense a pack of the scratch-off lottery tickets, wherein each of the scratch-off lottery tickets includes a set of game play characters covered by a scratch-off coating;
   a scanner associated with the array and configured to read a ticket pack code of each of the packs loaded into the array, wherein each ticket pack code is associated with a computer database file that includes identification of all or some of the game play characters for each of the scratch-off lottery tickets in the pack and location of the pack;
   a central server in communication with the scanner for receipt of the ticket pack codes and a signal that identifies bin location of the pack in the array; and
   a display at the retail establishment in communication with the central server, wherein, based on ticket location information from the central server, the display is configured to reveal one or more of the game play characters of at least certain ones of the scratch-off lottery tickets remaining in the array.

2. The lottery ticket dispensing system as in claim 1, wherein the display is configured to indicate the game play characters of the scratch-off lottery ticket next available for sale from one or more of the bins in the array.

3. The lottery ticket dispensing system as in claim 1, wherein the display is an interactive device wherein the player inputs game play characters of their choice, and the display indicates to the player location in the array of one or more of the scratch-off lottery tickets having the game play characters chosen by the player.

4. The lottery ticket dispensing system as in claim 3, wherein the display is configured to indicate specific bins in the array containing the scratch-off lottery tickets with the game play characters chosen by the player and location of the scratch-off lottery tickets within the specific bin.

5. The lottery ticket dispensing system as in claim 3, wherein the display is configured with a lottery kiosk at the retail establishment.

6. The lottery ticket dispensing system as in claim 1, wherein the scanner is a central scanner associated with the array and common to all of the bins in the array.

7. The lottery ticket dispensing system as in claim 1, wherein the scanner comprises an individual scanner configured with each of the bins in the array.

8. The lottery ticket dispensing system as in claim 1, wherein the scanner is in communication with the central server via a controller configured with the array.

9. A lottery ticket dispensing system configured to reveal game play characters on scratch-off lottery tickets to players prior to purchase of the scratch-off lottery tickets, comprising:
- a dispenser array at a retail establishment, the dispenser array having one or more bins each configured to house and dispense a pack of the scratch-off lottery tickets, wherein each of the scratch-off lottery tickets includes a set of game play characters covered by a scratch-off coating;
- a scanner associated with the array and configured to read a ticket pack code of each of the packs loaded into the array, wherein each ticket pack code is associated with a computer database file that includes identification of a subset of the game play characters for each of the scratch-off lottery tickets in the pack and location of the packs;
- a central server in communication with the scanner for receipt of the ticket pack codes and a signal that identifies bin location of the pack in the array; and
- a display enabled on a player's mobile smart device that is in communication with the central server via a computer application running on the smart device; and
- wherein the application is interactive and the player inputs game play characters of their choice via the mobile smart device, and the display indicates to the player location of one or more retail establishments having one or more of the scratch-off lottery tickets for sale having the game play characters chosen by the player.

10. The lottery ticket dispensing system as in claim 9, wherein the display further identifies the bins within the retail establishment having the scratch-off lottery tickets and location of the scratch-off lottery tickets within the bins.

11. The lottery ticket dispensing system as in claim 9, wherein the application enables recognition and receipt by the mobile smart device of a unique ID signal emitted by a transmitter device at the retail establishment, wherein once the player is within the retail establishment and within range of the transmitter device, the bin within the array containing the scratch-off lottery ticket having the game play characters chosen by the player is revealed to the player via the mobile smart device display.

12. The lottery ticket dispensing system as in claim 11, wherein location of the lottery ticket having the game play characters chosen by the player within the bin is also provided to the player via the mobile smart device.

13. The lottery ticket dispensing system as in claim 11, wherein the transmitter device is a Bluetooth Low Energy (BTLE) beacon that emits a BTLE ID signal unique to the retail establishment, and the application running on the mobile smart device receives the BTLE ID signal and transmits all or a portion of the BTLE ID signal to the central game server.

14. The lottery ticket dispensing system as in claim 9, wherein the application enables the mobile smart device to transmit an ID signal unique to the mobile smart device, and further comprising a receiver at the retail establishment wherein once the player is within the retail establishment and within range of the receiver, the bin within the array containing the scratch-off lottery ticket having the game play characters chosen by the player is revealed to the player via the mobile smart device display.

15. The lottery ticket dispensing system as in claim 14, wherein location of the lottery ticket having the game play characters chosen by the player within the bin is also provided to the player via the mobile smart device display.

* * * * *